United States Patent

Hetzel

[15] 3,663,894

[45] May 16, 1972

[54] ELECTROMECHANICAL OSCILLATOR FOR TIME MEASUREMENT

[72] Inventor: Max Hetzel, Bienne, Switzerland

[73] Assignee: Omega Louis Brandt & Frere S.A., Bienne, Switzerland

[22] Filed: Nov. 20, 1970

[21] Appl. No.: 91,321

[30] Foreign Application Priority Data

Dec. 2, 1969 Switzerland ........................17,902/69

[52] U.S. Cl. ............................331/110, 58/23 A, 58/23 AO, 331/116 M, 331/140, 331/156

[51] Int. Cl. ........................................................H03b 5/42

[58] Field of Search .............331/110, 116 M, 154, 156, 138, 331/140, 157; 58/23 R, 23 A, 23 AO

[56] References Cited

UNITED STATES PATENTS 3,061,796 10/1962 Schöninger ........................331/140 X 3,504,301 3/1970 Hetzel ..............................331/116 M

*Primary Examiner*—Roy Lake

*Assistant Examiner*—Siegfried H. Grimm

*Attorney*—Imirie & Smiley

[57] ABSTRACT

This invention relates to an electromechanical oscillator for time measurement, wherein the oscillation of a mechanical resonator is sustained through a coil coupled with the resonator, the coil being connected in one branch of a feedback bridge circuit connected between the input and output of an amplifier. In order to avoid a compensating inductance for said coil a specific network of resistors and condensers is provided including a compensating resistance for the ohmic component of the coil impedance and a supplemental resistance for compensation of the inductive component of the coil impedance.

2 Claims, 1 Drawing Figure

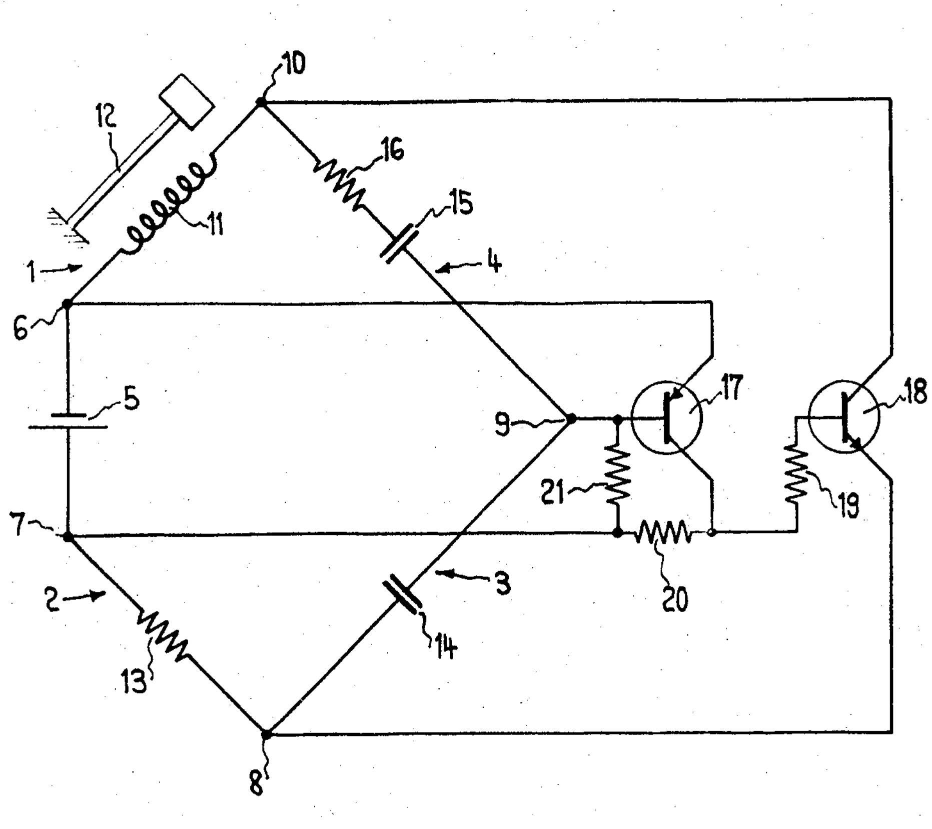
MAX HETZEL INVENTOR
BY
Imrie & Smiley
Att'ys.

ELECTROMECHANICAL OSCILLATOR FOR TIME MEASUREMENT

This invention relates to an electromechanical oscillator for time measurement, comprising a mechanical resonator, an amplifier and an electromechanical transducer having a coil connected into the one branch of a Wheatstone bridge circuit having two capacities connected in series in such a manner that they are parts of two other branches of said bridge circuit.

It has already been recognized in the art that an oscillator of this type cannot be used economically in a wrist watch unless a compensating inductance in the Wheatstone bridge may be avoided. Such a compensating inductance is too expensive and occupies too much space in a watch.

However, if no compensating inductance is connected into the bridge, the reactance of the inductive portion of the impedance of the transducer coil at the amplifier input remains without compensation such that it may cause undesired oscillations in the electrical system which may interfer with the usefull oscillation and cause instability of the resonator drive. In order to obtain perfect operation of the system the electric oscillations in the circuit should be controlled by the mechanical oscillations of the resonator without phase shift.

Certainly disturbing high-frequency oscillations might be prevented by adding a filter for damping such oscillations in the circuitry of the oscillator. However, such a filter would not be very efficient and satisfactory because a filter only suppresses oscillations within a limited frequency band, this band having no definite limits.

It is an object of this invention to eliminate all disturbing oscillations in the electric circuit of the above oscillators and all drawbacks resulting from such oscillations without using a compensating inductance or any other expensive and voluminous circuit element. The oscillator according to this invention is broadly characterized by one branch of the bridge circuit adjacent said branch comprising said coil including substantially a compensating resistance for compensating the influence of the ohmic component of said coil onto the electrical oscillations, and an other branch of the bridge circuit adjacent said branch including said coil comprising a supplemental ohmic resistance series connected with the capacity of that branch for compensation of the influence of the inductive component of the coil impedance onto the electric oscillations.

It may be shown mathematically that said supplemental resistance series connected with the condenser of the branch adjacent the branch including the coil may completely replace a compensating inductance in the complementary branch of the bridge circuit, because said resistance has a compensating effect to the disturbing influence of the inductance of the coil onto the oscillations and thus acts as a compensator for disturbing oscillations at all frequencies. Obviously, the electric oscillations induced by the movement of the mechanical resonator are not affected by the influence of the supplemental resistance and may freely control the electrical system.

This invention will now be explained in detail and by way of example with reference to the accompanying drawing illustrating the circuit diagram of an oscillator.

The circuit comprises a Wheatstone bridge circuit having four branches 1, 2, 3 and 4 whereof two adjacent branches are connected to a source 5 and have terminals 6 and 7. These terminals 6 and 7 are equivalent in view of the operation of the circuit. The remaining connections between bridge branches form terminals 8, 9 and 10.

Branches 1, 2 and 3 of the bridge circuit comprise a coil 11, a compensating resistor 13, and a condenser 14 respectively. Coil 11 is a part of an electromechanical transducer of which the mechanical portion is connected to a mechanical resonator 12. Bridge branch 4 comprises a condenser 15 and a supplemental resistor 16 having a purely ohmic resistance. The same applies for resistor 13 in branch 2. As mentionned above, the supplemental resistor 16 in branch 4 fully replaces from a functional point of view a compensating inductivity which would be connected into bridge branch 2. An amplifier is provided having two transistors 17 and 18 of complementary types and three resistors 19, 20 and 21 for determining and distributing the current flow in the various transistor circuits. The emitters of transistors 17 and 18 are connected to terminals 6 and 8 of the bridge circuit. The collector of transistor 18 is connected to terminal 10 such that terminals 8 and 10 of the bridge circuit may be short-circuited through the collector-emitter stretch of transistor 18 when the latter is in conducting state. Resistor 19 is connected between the collector of transistor 17 and the base of transistor 18. Terminal 7 of the bridge circuit is connected to the collector of transistor 17 through a resistor 20 and to the base of the same transistor through resistor 21. A direct connection is provided between terminal 9 and the base of transistor 17.

The energy for sustaining the oscillation of the resonator is transmitted to terminals 8 and 10. The control signal is transmitted to the amplifier input from terminals 6 and 9. This control signal is composed from a positive feedback signal produced by branches 1 and 4 and a negative compensating feedback signal produced and transmitted by branches 2 and 3. As explained above, a part of the compensation is produced in branch 4.

The values of the important circuit elements may be calculated as follows, whereby the following abreviations will be used:

$U_A$ = output voltage between terminals 6 and 9

$U_E$ = input voltage between terminals 8 and 10

$Z_1, Z_2, Z_3, Z_4$ = impedances of branches 1 to 4 of the bridge circuit $I_1, I_2, I_3, I_4$ = currents in the bridge branches 1 – 4

$R_W$ = ohmic resistance of coil 11

L = inductance of the electromechanical transdu-cer $C_{14}, C_{15}$ = capaciy of condensers 14 and 15

$R_{13}, R_{16}$ = value of resistors 13 and 16

$jw$ = imaginary unit of pulsation according to the following equations:

$$I_1 = I_2;\ I_3 = I_4$$

$$U_A = I_1 Z_1 - I_3 Z_4 \quad (1)$$

$$I_1 = (U_E/Z_1 + Z_2);\ I_3 = (U_E/Z_3 + Z_4) \quad (2)$$

$$(1) + (2): U_A = (U_E \cdot Z_1/Z_1 + Z_2) - (U_E \cdot Z_4/Z_3 + Z_4) \quad (3)$$

$$\frac{U_A}{U_E} = \frac{Z_1 Z_3 - Z_2 Z_4}{Z_1 Z_3 + Z_1 Z_4 + Z_2 Z_3 + Z_2 Z_4} \quad (3a)$$

Condition:

$U_A = 0$ for all frequencies except the frequency of the resonator, this means:

$$Z_1 Z_3 = Z_2 Z_4 \quad (4)$$

The values of equation (4) are replaced by $$Z_1 = R_W + j\omega L \quad (5)$$

(= impedance of the transducer of which the mechanical portion, namely the magnetic system, is immobilized)

$$Z_2 = R_{13};\ Z_3 = (1/j\omega C_{14}) \quad (6, 7)$$

$$Z_4 = R_{16} + (1/j\omega C_{15}) \quad (8)$$

from this:

$$R_W + j\omega L = j\omega C_{14} \cdot R_{13} \cdot R_{16} + R_{13} (C_{14}/C_{15}) \quad (9)$$

The real part of equation (9):

$$R_{13} = R_W \cdot (C_{15}/C_{14}) \quad (9a)$$

is the condition for compensation of the influence of the ohmic resistance of coil 11.

The imaginary portion of equation (9):

$$j\omega L = j\omega C_{14} \cdot R_{13} \cdot R_{16} \text{ or}$$

$$R_{16} = (L/R_W \cdot C_{15}) \quad (9b)$$

is independent of the frequency.

If the value of the supplemental resistance 16 is chosen in accordance with equation (9*b*) the influence of the inductive portion of the coil impedance is compensated for all frequencies. This means that the resistance 16 has the same effect on the relation between the input signal and output signal of the bridge circuit as a compensating inductance in branch 2 of the bridge circuit.

What I claim is:

1. An electromechanical oscillator for time measurement, comprising a mechanical resonator, an amplifier and an electromechanical transducer having a coil connected into one branch of a Wheatstone bridge circuit, said resonator being thereby coupled to said one branch, and said amplifier being connected between the bridge output terminals and bridge input terminals, two capacities connected in series in such a manner that they are parts of two other branches of said bridge circuit, one branch of the bridge circuit adjacent said branch comprising said coil including substantially a compensating resistance for compensating the influence of the ohmic component of said coil onto the electrical oscillations, and an other branch of the bridge circuit adjacent said branch including said coil comprising a supplemental ohmic resistance series connected with the capacity of that branch for compensation of the influence of the inductive component of the coil impedance onto the electric oscillations, and a source of E.M.F. connected to said bridge, and to said amplifier, for supplying energy for said oscillator.

2. An oscillator according to claim 1, wherein the value of said supplemental resistance is approximately equal to the inductance of the coil divided by the value of the ohmic resistance of the transducer and the capacity of the bridge branch including said supplemental resistance.

* * * * *